United States Patent [19]

Kahn

[11] Patent Number: 4,747,653
[45] Date of Patent: May 31, 1988

[54] CROSSOVER ARRANGEMENT FOR OPTICAL CONDUCTORS

[75] Inventor: David A. Kahn, Nepean, Canada
[73] Assignee: Northern Telecom Limited
[21] Appl. No.: 839,654
[22] Filed: Mar. 14, 1986
[51] Int. Cl.[4] .................................... G02B 6/26
[52] U.S. Cl. ........................ 350/96.15; 350/96.16; 350/96.27
[58] Field of Search ............... 350/96.15, 96.16, 96.28

[56] References Cited

U.S. PATENT DOCUMENTS

| | | | |
|---|---|---|---|
| 3,870,398 | 3/1975 | Love | 350/96.16 |
| 4,130,342 | 12/1978 | McMahon | 350/96.14 |

FOREIGN PATENT DOCUMENTS

| | | | |
|---|---|---|---|
| 0053324 | 9/1982 | European Pat. Off. | 350/96.15 |
| 0141145 | 11/1979 | Japan | 350/96.15 |
| 0035105 | 7/1981 | Japan | 350/96.15 |
| 2020447 | 11/1979 | United Kingdom | 350/96.16 |

Primary Examiner—Gene Wan
Assistant Examiner—James C. Lee
Attorney, Agent, or Firm—Thomas Adams

[57] ABSTRACT

A crossover arrangement for optical conductors, each in the form of a rod of light-transmissive material, includes a multifaceted, e.g. polyhedral member having pairs of mutually parallel opposed facets. Each pair of facets extend in a direction transverse, preferably perpendicular, to that in which a second pair of facets extend. The end face of each optical conductor is abutted against one of the facets of the polyhedron. Each facet has a coating of a material having a lower refractive index than that of the polyhedron or the optical conductors. Light entering the polyhedron from one conductor passes across the polyhedron and into the opposite conductor, being constrained to stay within the polyhedron by the coatings on the side facets. Preferably the polyhedron member is a cube and the optical conductors are of square cross-sectional shape.

12 Claims, 1 Drawing Sheet

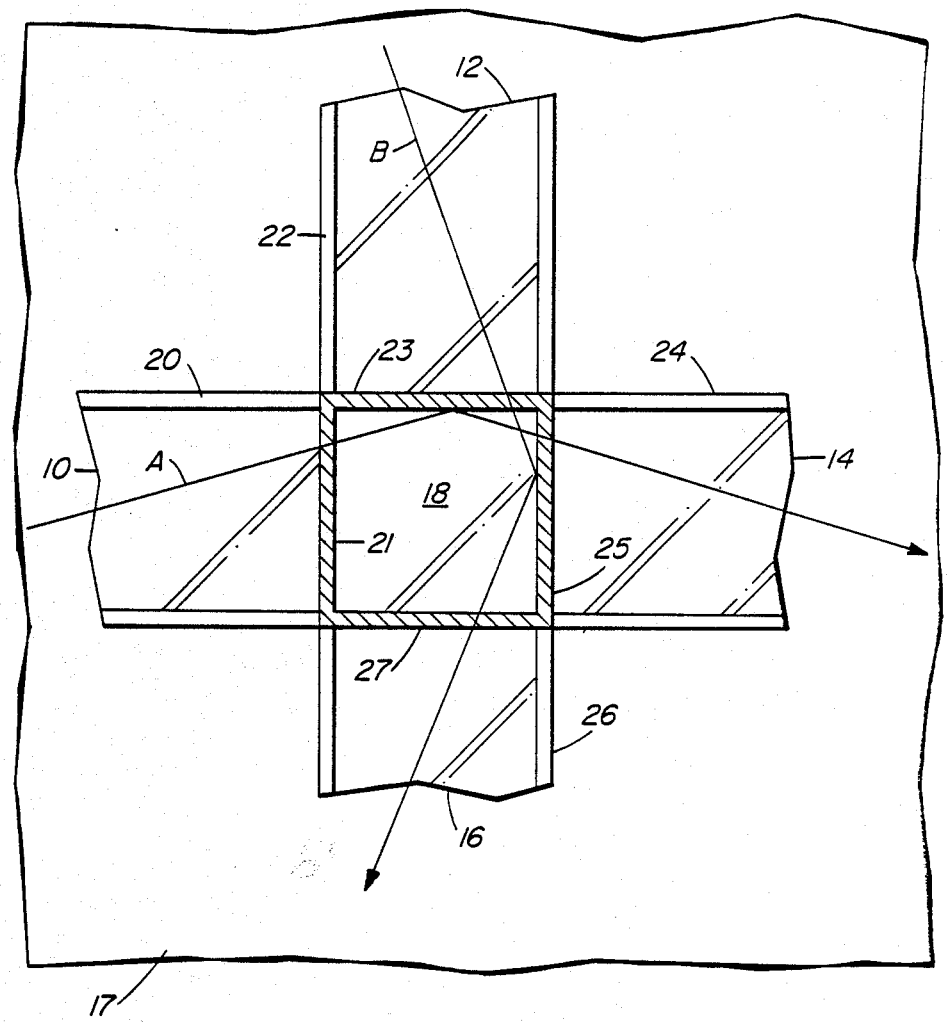

CROSSOVER ARRANGEMENT FOR OPTICAL CONDUCTORS

BACKGROUND TO THE INVENTION

The invention relates to optical waveguides or conductors such as are used in telecommunications and like equipment and is especially concerned with one light path crossing another light path.

Optical conductors now being proposed for use in backplanes of computers and telecommunications equipment comprise rods of light-transmissive material, clad with a material having a lower refractive index. The rod may have inclined reflector surfaces spaced apart along its length. The reflector surfaces deflect light travelling along the optical conductor so that it emerges laterally or enters laterally and is deflected to travel along the optical conductor. Such an optical conductor is disclosed in copending U.S. patent application No. 840,262, filed Mar. 17, 1986 in the name of D. Kahn.

As the density and complexity of the optical backplane increases, there will eventually arise a need for optical conductors to cross, one over another, in order to satisfy the topological requirements of the system. In the known art of metallic conductors, this usually involves a multiple layer printed circuit card, or the use of discrete insulated wire leads.

SUMMARY OF THE INVENTION

According to the present invention a crossover arrangement for intersecting optical conductors each in the form of a rod of light-transmissive material with a cladding of a material having a lower refractive index, comprises a multifaceted member of light transmissive material, having at least two pairs of opposed mutually parallel facets, one pair extending transversely to the second pair of opposed mutually parallel facets. Each facet of each pair has abutted thereto the end face of a respective one of the intersecting optical conductors.

The multifaceted member may have the same refractive index of the optical conductors. Each said facet has a coating of a material having a lower refractive index than that of the body of the optical conductor. Conveniently, but not essentially, this coating has the same refractive index as the cladding on the optical conductors. Where the optical conductors and multifaceted member are of polycarbonate, the coating may be an oxide of silicon e.g. silicon dioxide.

Preferably, the coating thickness on the facets is of the order of the wavelength of the light to be conveyed and very much less than the width of the waveguide or optical conductor.

The multifaceted member may be a polyhedron, especially a parallelepiped, and the optical conductors have a cross-sectional shape, conveniently rectangular, corresponding to the shape of a facet. In one preferred embodiment the multifaceted member is a cube and the optical conductors are square rods. In other embodiments the multifaceted member has one pair of facets inclined relative to the other pair so that the conductors intersect at an angle other than perpendicular.

BRIEF DESCRIPTION OF THE DRAWING

An embodiment of the invention will now be described by way of example only and with reference to the single accompanying drawing, which shows a cross-sectional plan view of a first embodiment of intersecting optical conductors.

DETAILED DESCRIPTION OF A PREFERRED EMBODIMENT

The drawing shows four optical conductors 10, 12, 14 and 16, respectively, mounted upon a backplane 17 and connected together in cruciform fashion to provide two light-transmissive paths intersecting each other perpendicularly. The four optical conductors 10, 12, 14 and 16 lie in the same plane and have their respective end faces each abutted against a corresponding facet of a multi-faceted, specifically cubic, coupling member 18. The optical conductors comprise rods of light-transmissive plastics material, for examle polycarbonate. They are square in cross-sectional shape so that their end faces conform closely to the shape of the face of the cubic coupling member 18. The longitudinal surfaces have cladding 20, 22, 24, 26, respectively said corresponding facets of the cube 18 have coatings 21, 23, 25 and 27, respectively. Both the claddings and the coatings are of a material having a refractive index lower than that of the rods and the cube 18. For example the cladding and coating might be glass (e.g. an oxide of silicon with a refractive index of 1.45/1.54 compared with about 1.58 for polycarbonate).

Preferably the cube should be "sealed" to prevent loss of light. Thus, any surfaces not abutted by the end of an optical conductor should preferably have a coating, although this could, of course, be provided by a separate blanking member. Preferably, however, all of the faces of the cube are coated.

The coating thickness is preferably much less than the spacing between the faces. Preferably the thickness is of the order of one wavelength.

Arrow A indicates the path taken by light travelling along optical conductor 10. It is confined within the conductor by the cladding 20. On reaching the end of the conductor 10 the light is substantially unimpeded by the facet coating 21 (because of the high angle of incidence), and enters the cube 18.

The facet coatings 23 and 27, respectively, constitute continuations of the cladding on conductor 10 and so constrain the light to pass across the cube 18. Having crossed the cube 18, the light passes, substantially unimpeded by the facet 25 coating, into conductor 14.

Light travelling along optical conductor 12 is conveyed across the cube 18 and into the optical conductor 16 in a similar manner.

The rods may be of polycarbonate and the cladding an oxide of silicon, e.g. silicon monoxide. The cube may also be polycarbonate and the coating the same oxide of silicon.

Various modifications are possible without departing from the scope of the invention. For example, the multi-faceted member might be a parallelogram with one pair of facets inclined relative to the other pair of facets. Where a facet of the multifaceted member is not "used" i.e. no optical conductor is abutted against it, and it has no coating of its own, it might be "sealed" by means of a blanking plate of lower refractive index material.

An advantage of embodiments of the present invention is that optical crossover of optical conductors in the form of rods of light transmissive material may be achieved in the same planes. Such a planar arrangement will facilitate simple, and hence economical, backplane construction.

What is claimed is:

1. Apparatus comprising an assemblage of optical conductors, each comprising a rod of light-transmissive material with a cladding of a material having a lower refractive index than that of said rod, and a multifaceted member of light-transmissive material having at least two pairs of mutually parallel opposite facets, each facet of each pair having abutted thereto an end face of a respective one of said plurality of optical conductors, and a coating being provided on each said facet abutted by an optical conductor, said coating having a refractive index less than the refractive index of the associated facet, such that light passing across the multifaceted member from one of a pair of facets to the other facet of said pair is constrained from emerging from said member through either facet of the other of said pairs of facets.

2. Apparatus as defined in claim 1, wherein the multifaceted member comprises a polyhedron.

3. Apparatus as defined in claim 2, wherein said polyhedron comprises a cube and said optical conductors each have a square cross-section.

4. Apparatus as defined in claim 1, wherein said coating has a thickness of the order of one wavelength of the light to be transmitted.

5. Apparatus as defined in claim 1, 2, 3 or 4, wherein said coating is provided upon all of said facets of said polyhedron.

6. Apparatus as defined in claim 1, 2, 3 or 4, wherein said pairs of facets comprise a first pair extending perpendicular to a second pair.

7. A multifaceted member, for apparatus as defined in claim 1, comprising a block of light-transmissive material, at least two pairs of mutually parallel opposite facets of the block having a coating of a material having a refractive index that is lower than that of said light-transmissive material.

8. A multifaceted member as defined in claim 7, wherein the thickness of the coating on said facets is of the order of the wavelength of the light to be transmitted.

9. A multifaceted member as defined in claim 7 or 8, having said coating on all of its said facets.

10. Apparatus as defined in claim 1, 2, 3 or 4, wherein said rods are mounted upon a backplane so as to extend in a plane substantially parallel to that of said backplane, said multifaceted member being located in said plane at the intersection of longitudinal axes of said rods.

11. Apparatus as defined in claim 10, wherein said coating is provided upon all of said facets of said polyhedron.

12. Apparatus as defined in claim 10, wherein said pairs of facets comprise a first pair extending perpendicular to a second pair.

* * * * *